United States Patent
Iwashiro (10) Patent No.: US 11,875,821 B2
(45) Date of Patent: Jan. 16, 2024

(54) DISK DEVICE

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Masafumi Iwashiro, Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 17/900,473

(22) Filed: Aug. 31, 2022

(65) Prior Publication Data

US 2023/0307001 A1    Sep. 28, 2023

(30) Foreign Application Priority Data

Mar. 24, 2022  (JP) ................................. 2022-049161

(51) Int. Cl.
  *G11B 5/00*   (2006.01)
  *G11B 20/10*  (2006.01)
  *G11B 5/02*   (2006.01)
  *G11B 21/08*  (2006.01)
  *G11B 5/012*  (2006.01)

(52) U.S. Cl.
  CPC .............. *G11B 21/08* (2013.01); *G11B 5/012* (2013.01)

(58) Field of Classification Search
  CPC ................ G11B 5/02; G11B 20/10027; G11B 20/10046; G11B 33/08; G11B 21/08; G11B 20/10; G11B 27/36; G11B 5/00; G11B 5/09; G11B 20/10013; G11B 5/5962; G11B 5/012; G11B 20/18
  USPC ..................................................... 360/65, 67
  See application file for complete search history.

(56) References Cited

U.S. PATENT DOCUMENTS

| | | |
|---|---|---|
| 9,202,496 B2 | 12/2015 | Supino |
| 9,460,744 B1 | 10/2016 | Gaub et al. |
| 9,536,553 B1 | 1/2017 | Seo et al. |
| 9,928,862 B1 | 3/2018 | Park et al. |
| 10,553,248 B1 * | 2/2020 | Iwashiro ................ G11B 33/08 |
| 2003/0058571 A1 | 3/2003 | Kisaka |

FOREIGN PATENT DOCUMENTS

| | | |
|---|---|---|
| JP | 2003-109336 A | 4/2003 |
| JP | 2004-127410 A | 4/2004 |

* cited by examiner

*Primary Examiner* — Nabil Z Hindi
(74) *Attorney, Agent, or Firm* — Kim & Stewart LLP (57) ABSTRACT

A disk device includes a first controller configured to determine a first operation amount of a first actuator based on a difference between a current position and a target position of a head, a second controller configured to determine a second operation amount of a second actuator based on the difference, and a processor. The processor is configured to perform a first filtering to calculate a first filter value based on a vibration detected at multiple points in time and filter coefficients, perform a second filtering to generate a second filter value based on the vibration detected at each of the multiple points in time, and update the filter coefficients based on the second filter values and a difference between the target position and an updated position of the head.

20 Claims, 6 Drawing Sheets

DISK DEVICE

CROSS-REFERENCE TO RELATED APPLICATION(S)

This application is based upon and claims the benefit of priority from Japanese Patent Application No. 2022-049161, filed Mar. 24, 2022, the entire contents of which are incorporated herein by reference.

FIELD

Embodiments described herein relate generally to a disk device.

BACKGROUND

Generally, a disk storage device (hereinafter referred to as "disk device") such as a hard disk drive includes a head positioning control system for positioning a head such as a magnetic head to a target position on a disk medium, that is, an access target track. The head performs a read/write operation with respect to the target position on the disk medium.

Some type of the head positioning control system has a vibration reduction function achieved by a feed-forward control of the position of the head using observed external vibration. According to such a head positioning control system, the position of the head can be properly controlled even when the vibration direction changes and for actuators having different performance characteristics.

DETAILED DESCRIPTION

In recent years, a magnetic disk device has a two-stage actuator equipped with a micro actuator (MA) at a tip end of an arm to drive a head minutely in addition to a voice coil motor (VCM). In addition, separate controllers are provided for the VCM and the MA. Therefore, even in a disk device equipped with a two-stage actuator, it is desirable to implement an external vibration reduction function which adapts to performance of the actuator and fluctuations in a direction of external vibration.

Embodiments are directed to achieving an external vibration reduction function with respect to changes in vibration direction and actuators having different performance characteristics in a disk device having the two-stage actuator.

In general, according to an embodiment, a disk device includes a disk, an actuator assembly, a head mounted on the actuator assembly, a first actuator configured to move the actuator assembly, a second actuator configured to move the head, a vibration sensor, a first controller configured to determine a first operation amount of the first actuator based on a difference between a current position of the head and a target position of the head, the first operation amount being corrected using a first filter value, a second controller configured to determine a second operation amount of the second actuator based on the difference, and a processor. The processor is configured to perform a first filtering to calculate a first filter value based on a vibration detected by the vibration sensor at multiple points in time and filter coefficients, perform a second filtering to generate a second filter value based on the vibration detected by the vibration sensor at each of the multiple points in time, and update the filter coefficients based on the second filter values and a difference between the target position and an updated position of the head, which has been positioned thereto by operating the first actuator by the corrected first operation amount and operating the second actuator by the second operation amount.

A magnetic disk device according to embodiments will be described in detail with reference to the accompanying drawings. However, the present disclosure is not limited to these embodiments.

First Embodiment

Figure 1:
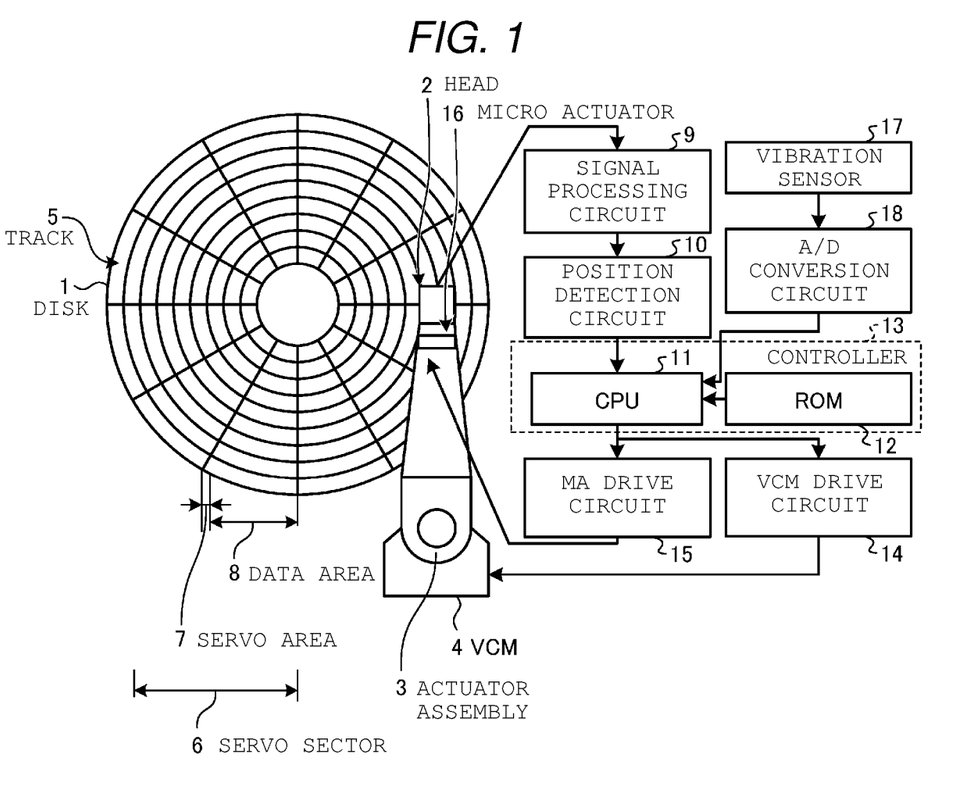
FIG. 1 is a schematic diagram illustrating an example of a configuration of a disk device according to a first embodiment.

FIG. 1 is a block diagram illustrating a main part of a disk device according to a first embodiment.

Configuration of Disk Device

As illustrated in FIG. 1, the disk device according to the first embodiment includes a disk 1, which is a recording medium, a head 2 which executes a data read/write operation, and an actuator assembly 3.

The disk 1 is rotated by a spindle motor. The disk 1 includes a large number of concentric tracks 5 on a surface thereof. Each track 5 includes a plurality of servo sectors 6. Each servo sector 6 includes a servo area 7 and a data area 8. Therefore, each track 5 includes a plurality of servo areas 7, which are located at predetermined intervals in a circumferential direction. In the servo area 7, servo information (e.g., location information) used for detecting a position of the head 2 by a head positioning control system during a normal read/write operation is stored. Further, a space between adjacent two servo areas 7 is the data area 8, and user data is stored therein.

The head 2 has a structure in which a read head and a write head are separately mounted on a slider. The read head reads the servo information and the user data stored in the disk 1. During a head positioning control, the read head reads the servo information at regular intervals corresponding to a rotation speed of the disk 1. The write head writes user data into the disk 1.

The actuator assembly 3 has the head 2 mounted thereon and moves the head 2 in a radial direction of the disk 1 by a driving force of a voice coil motor (VCM) 4. The VCM 4 is a control target of a head positioning control in a narrow sense, and is a main element of an actuator mechanism.

Further, a micro actuator 16 is provided at a tip end of an arm of the actuator assembly 3. The micro actuator 16 moves the head 2 minutely.

Further, the disk device has a read/write channel (e.g., a signal processing circuit 9 and a position detection circuit 10), a microcontroller 13, a VCM drive circuit 14, an MA drive circuit 15, and a vibration sensor 17.

The signal processing circuit 9 processes a read signal or a write signal corresponding to the servo information or user data read by the read head of the head 2. Further, the position detection circuit 10 extracts the servo information from the read signal and generates a position detection signal for detecting the position of the head 2.

The microcontroller 13 has a microprocessor (CPU) 11, which is a main element to perform the head positioning control, and a ROM 12, which stores a program (e.g., firmware) and various control parameters. As will be described below, the CPU 11 implements a feedback control and a feed-forward control of the head positioning control. The CPU 11 calculates a control value (including an operation amount described below), controls drive currents supplied to the VCM 4 and the micro actuator 16 via the VCM drive circuit 14 and the MA drive circuit 15, respectively, during the head positioning control.

The vibration sensor 17 detects (observes) an acceleration of disturbance (e.g., external vibration) that causes a vibration or an impact on the disk device, and outputs a detection signal (e.g., analog detection signal) indicating the acceleration to an A/D conversion circuit 18. The A/D conversion circuit 18 converts the detection signal (may be referred to as "acceleration signal") of the vibration sensor 17 into a digital value and outputs the digital value to the CPU 11. The vibration sensor 17 is, for example, a shock sensor or a rotational vibration (RV) sensor.

As described above, the disk device according to the present embodiment includes a two-stage actuator, and implements an external vibration reduction function for various actuators of different performances and changes in the direction of external vibration.

Head Positioning Control System

Figure 2:
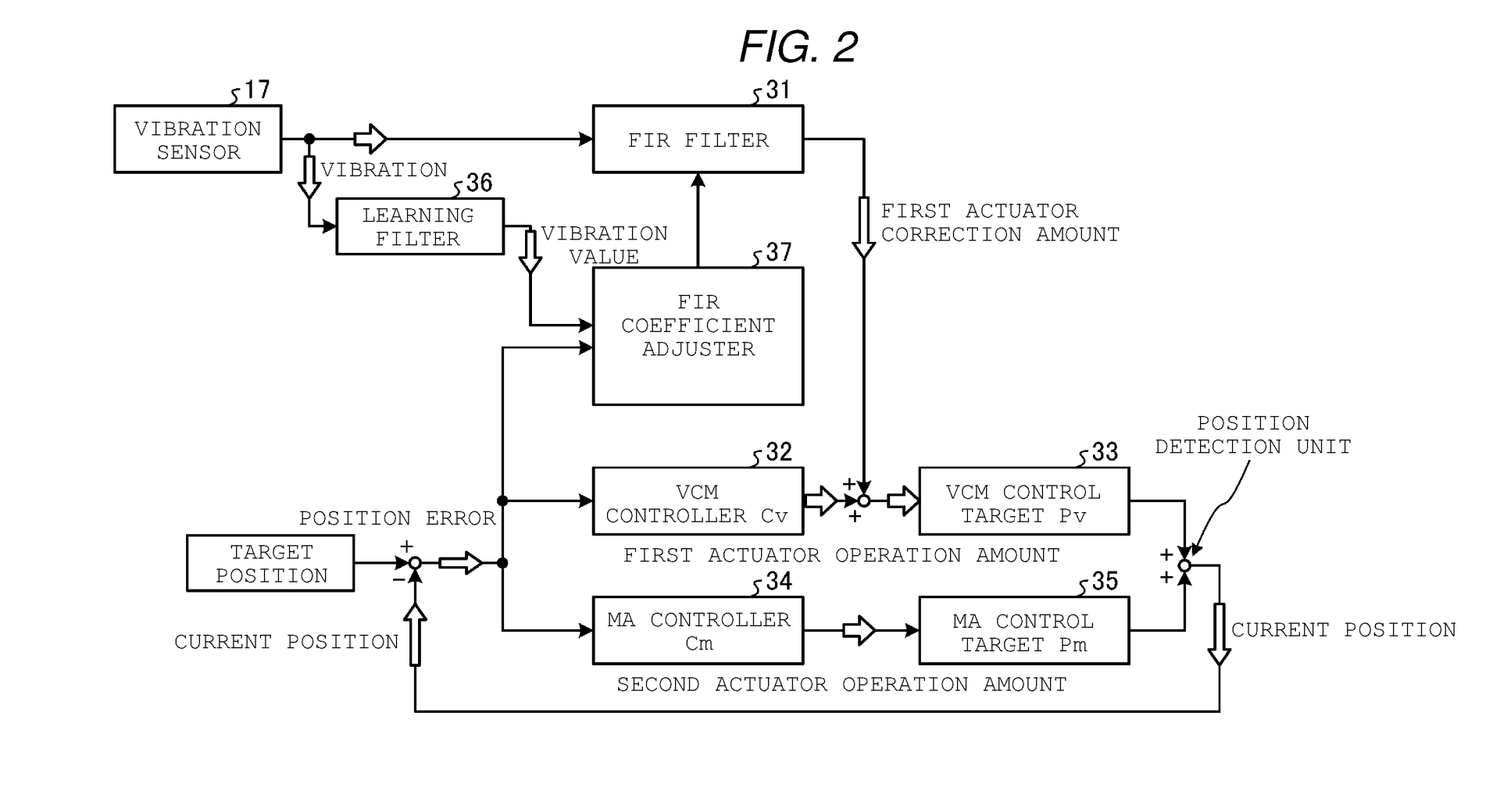
FIG. 2 is a schematic diagram illustrating a configuration of a head positioning control system according to the first embodiment.

Next, with reference to FIG. 2, a configuration and operation of a head positioning control system incorporated in the disk device according to the first embodiment will be described.

The head positioning control system is a system which executes an arithmetic operation to determine a position of the head 2 using the vibration detected by the vibration sensor 17. The head positioning control system includes a finite impulse response (FIR) filter 31, a VCM controller 32 (e.g., the VCM control circuit 14), a VCM control target 33 (e.g., the VCM 4), an MA controller 34 (e.g., MA control circuit 15), an MA control target 35 (e.g., the MA 16), a learning filter 36, and an FIR coefficient adjuster 37.

The head positioning control performed by the head positioning control system is implemented by the CPU 11. The CPU 11 acquires a current position of the head 2 from the position detection circuit 10 each time a rotation angle of the disk 1 is at one of a plurality of predetermined angles. The interval of acquiring the current position of the head 2 may be referred to as a head position observation period. Further, the CPU 11 calculates control values to be input to control targets (i.e., the VCM control target 33 and the MA control target 35) at regular time intervals (e.g., servo cycle). The VCM 4 and the micro actuator 16 in the disk device according to the present embodiment are driven by multi-rate control, which is driven by 1/N period (N is an integer of two or more) of the head position observation period. In an implementation, the timing when the A/D conversion circuit 18 performs the A/D conversion of an analog value of a detection result by the vibration sensor 17 is often the same as the timing of the head position observation. In another implementation, the head position observation may be performed at multiple rates, because the timing to perform the A/D conversion has less restriction unlike the timing to read the servo information from the disk.

A limit value of a drive current supplied to the VCM 4 is set in advance by the VCM drive circuit 14. Further, a limit value of the drive current supplied to the micro actuator 16 is set in advance by the MA drive circuit 15.

When vibration is detected by the vibration sensor 17, the FIR filter 31 generates a filter value, which is a value (may be referred to as correction value) of an operation amount of the VCM 4 that is corrected based on a vibration value (e.g., acceleration) detected by the vibration sensor 17 and an FIR filter coefficient.

Here, it is assumed that accelerations observed in a sampling period are a0, a1, a2, . . . (the larger the subscript, the older the sampled value), and the FIR filter coefficients are f0, f1, f2, . . . . An output value (may be referred to as "first actuator correction amount") of the FIR filter 31 is expressed as shown in the following expression (1).

$$\text{FIR Filter Output: } f0*a0+f1*a1+f2*a2+ \ldots \quad (1)$$

Further, the VCM controller 32 outputs a signal indicating an operation amount (may be referred to as a "first actuator operation amount") of the VCM 4 that is calculated based on a position error between a current position of the head 2 and a target position of the head 2. Here, the current position of the head 2 is location information read from the disk 1 by the head. The target position is a position of the head 2 at which the head 2 will access or is targeted to access on the disk 1. Then, the CPU 11 causes the VCM control target 33 to receive a signal indicating a corrected operation amount, which is obtained by adding the signal indicating the first actuator operation amount and a signal indicating the first actuator correction amount from the FIR filter 31. Then, the VCM control target 33 moves the actuator assembly 3 according to the received signal, which changes the position of the head 2 in a coarse manner. Further, the operation amount of the VCM 4 is, for example, an index value of how much the VCM 4 should be moved, and the VCM control circuit 14 (e.g., a VCM driver IC) controls a current to be supplied through a coil of the VCM 4 based on the index value.

The MA controller 34 outputs a signal indicating an operation amount (may be referred to as a "second actuator operation amount") of the MA control target 35 based on the position error. Then, the CPU 11 causes the MA control target 35 to receive a signal indicating the second actuator operation amount. Then, the MA control target 35 moves the micro actuator 16 according to the received signal, which changes the position of the head 2 in a fine manner. Thereafter, the CPU 11 detects the current position of the head 2, which is moved by the VCM control target 33 and the MA control target 35. In this way, the CPU 11 detects the current position of the head 2 that is moved based on the corrected operation amount and a second actuator operation amount. Further, the CPU 11 calculates the position error, which is a difference between the target position and the current position. The position error is also input to the FIR coefficient adjuster 37, in addition to the VCM controller 32 and the MA controller 34.

The FIR coefficient adjuster 37 updates the coefficients of the FIR filter 31 based on the position error and a vibration value that is obtained by the learning filter 36 based on the vibration detected by the vibration sensor 17. Specifically, the FIR coefficient adjuster 37 updates the coefficients of the FIR filter 31 represented by the above expression (1) in each sampling by the following inequation (2). b0, b1, b2, . . . in the inequation (2) are acceleration values output from the learning filter 36. G in the inequation (2) is a learning gain. "p0" in the inequation (2) is the position error between a current position of the head 2 and a target position of the head 2. Further, ← in the inequation (2) represents a variable assignment.

$$f0 \leftarrow f0 + G*p0*b0$$

$$f1 \leftarrow f1 + G*p0*b1$$

$$f2 \leftarrow f2 + G*p0*b2 \qquad (2)$$

. . .

The learning filter 36 is a linear digital infinite impulse response (IIR) filter having a transfer function expressed by the following expression (3), where Cv denotes a characteristic of the VCM controller 32, Pv denotes a characteristic of the VCM control target 33, Cm denotes a characteristic of the MA controller 34, and Pm denotes a characteristic of the MA control target 35.

$$\text{Transfer Function: } Pv/(1+Cv*Pv+Cm*Pm) \qquad (3)$$

Here, it is assumed that the numerator coefficients of the transfer function of the learning filter 36 be n0, n1, n2 . . . , and the denominator coefficients of the transfer function be 1, d1, d2, . . . . Then, the arithmetic method of the acceleration by the learning filter 36 is as shown in the following inequation (4).

$$\text{Output of Learning filter 36: } b0 \leftarrow n0*a0 + n1*a1 + n2*a2 \cdots - d1*-1 - d2*b2 \qquad (4)$$

Figure 3:
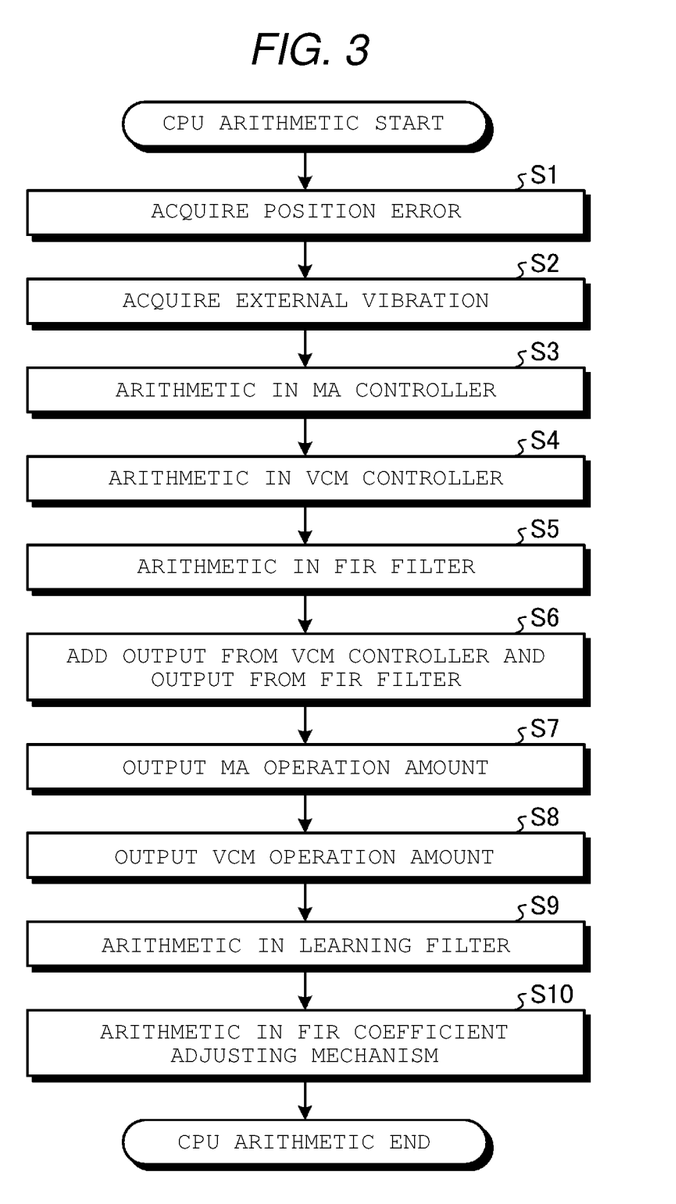
FIG. 3 is a flowchart illustrating a procedure of position adjustment process of a two-stage actuator according to the first embodiment.

Subsequently, the procedure of a position adjustment process of the two-stage actuator will be described with reference to a flowchart illustrated in FIG. 3. The CPU 11 acquires the position error that is calculated based on the target position of the head 2 and the current position of the head 2 detected by the position detection circuit 10 (step S1).

Further, the CPU 11 acquires the external vibration detected by the vibration sensor 17 (step S2). The MA controller 34 calculates the operation amount of the micro actuator 16 based on the position error (step S3). The VCM controller 32 calculates the operation amount of the VCM 4 based on the position error (step S4). The FIR filter 31 generates a filter value based on the external vibration detected by the vibration sensor 17 and the coefficients (step S5). The CPU 11 adds the filter value output by the FIR filter 31 and the operation amount output by the VCM controller 32 (step S6). The CPU 11 outputs an MA operation amount (e.g., indicating a position of the micro actuator 16) based on the operation amount of the micro actuator 16 (step S7). The CPU 11 outputs a VCM operation amount (e.g., indicating a position of the actuator assembly 3) that is calculated based on the filter value output by the FIR filter 31 and the operation amount output by the VCM controller 32 (step S8).

The learning filter 36 executes the linear digital IIR filter arithmetic represented by the expression (3) with respect to the external vibration output by the vibration sensor 17 (step S9). The FIR coefficient adjuster 37 updates the coefficients of the FIR filter 31 based on the position error and the signal output from the learning filter 36 (step S10).

Figure 4A:
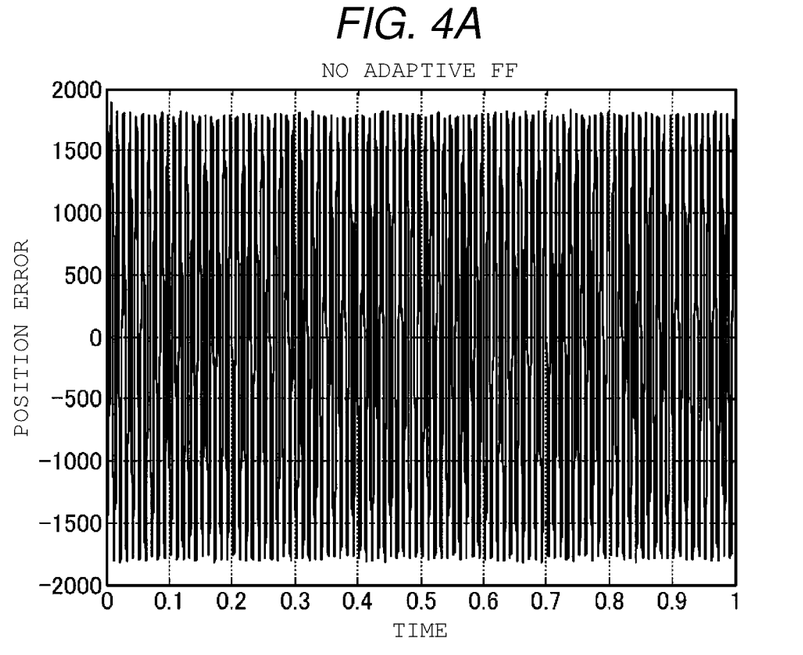
FIG. 4A is a graph showing a change in position error of a comparative example.

Here, a case where the above-described updates of the coefficients of the FIR filter is not performed will be considered as a comparative example. When the coefficient updates are not performed, the operation amount is determined without considering the past position error, so that the position error may not be reduced. Here, FIG. 4A illustrates a graph showing a change in the position error according to the comparative example. The vertical axis is the position error, and the horizontal axis is the time. As illustrated in FIG. 4A, the position error does not converge even after lapse of a quite long time.

Figure 4B:
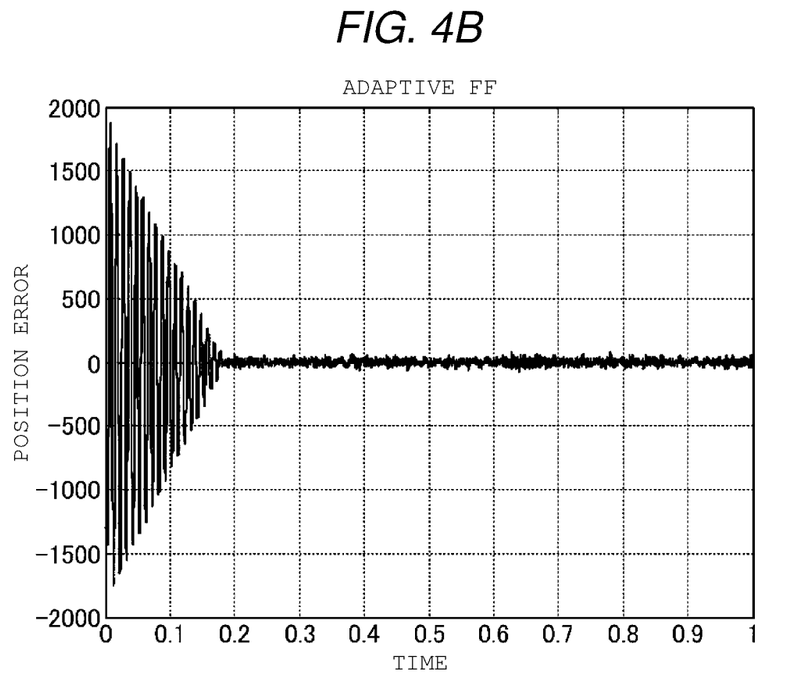
FIG. 4B is a graph showing a change in position error when an adaptive filter according to the first embodiment is applied.

Here, FIG. 4B illustrates a graph showing the change in the position error when the above-described updates of the coefficients of the FIR filter is performed. The vertical axis is the position error, and the horizontal axis is the time. As illustrated in FIG. 4B, the position error converges after a certain time elapses.

The disk device according to the first embodiment detects vibration from the outside and generates the first actuator correction amount based on the vibration and the coefficients of the FIR filter 31. Further, the disk device calculates the corrected operation amount of the VCM 4 based on the first actuator correction amount and the first actuator operation amount of the VCM 4, and calculates the second actuator operation amount of the micro actuator 16. Then, the disk device calculates the current position of the head 2 that is moved based on the corrected operation amount and the second actuator operation amount. The disk device updates the coefficients of the FIR filter 31 based on the position error, and the vibration value calculated by the learning filter 36 based on the vibration.

Since the coefficients of the FIR filter 31 are updated based on the position error and the vibration value calculated by the learning filter 36, the position of the head 2 is adjusted so as to reduce the position error. Therefore, even in a disk device including a two-stage actuator, it is possible to achieve the external vibration reduction function for various actuators of different performances and changes in the direction of the external vibration.

Second Embodiment

In the first embodiment, an example in which the transfer function of the learning filter is predetermined is described. In a second embodiment, the position error is measured multiple times by adding a test signal to the feedback control system of the two-stage actuator, and the parameters of the learning filter are identified.

Figure 5:
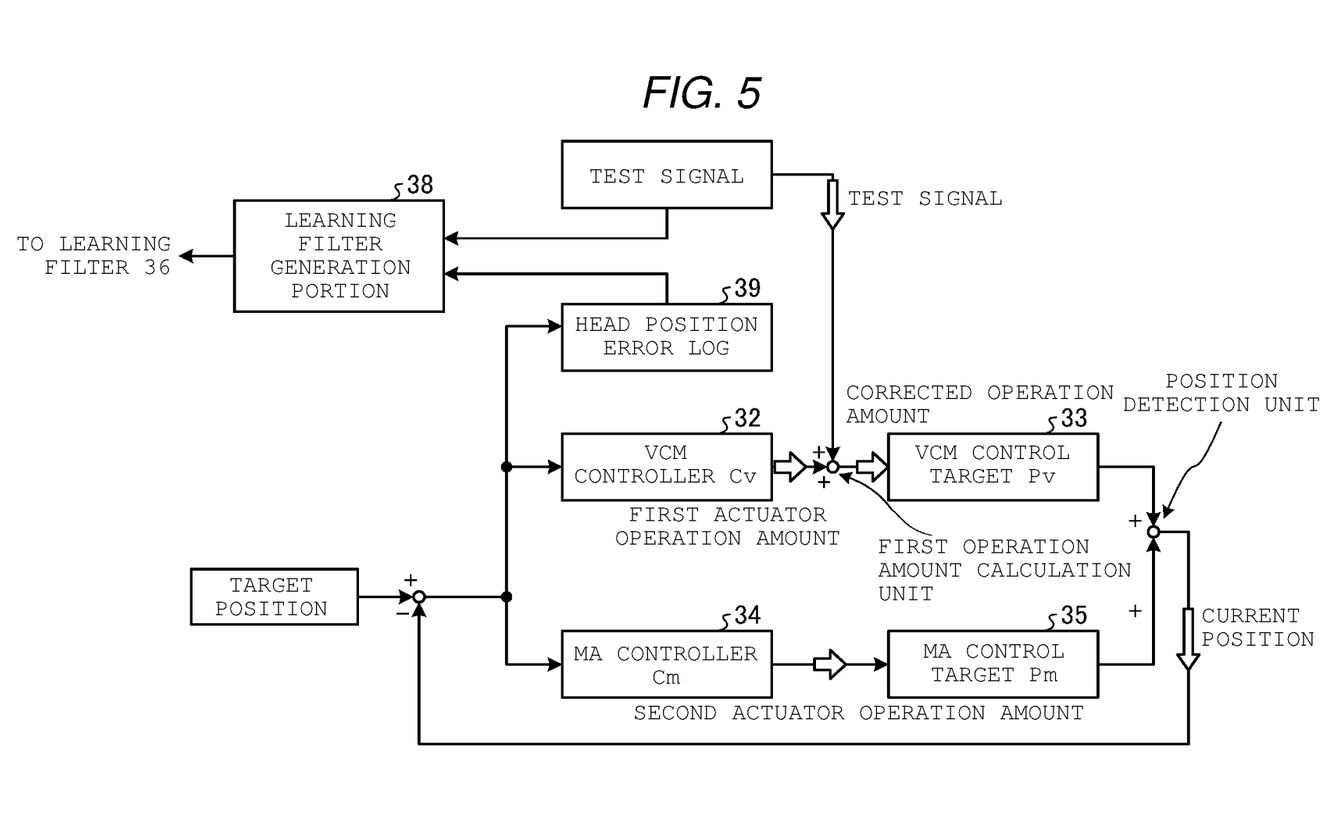
FIG. 5 is a schematic diagram illustrating a configuration of a head positioning control system in a disk device according to a second embodiment.

FIG. 5 illustrates a configuration of a head positioning control system implemented in a disk device according to the second embodiment. The following description of the head positioning control system according to the second embodiment focuses on the point of generating the learning filter 36. The head positioning control system according to the second embodiment includes the VCM controller 32, the VCM control target 33, the MA controller 34, the MA control target 35, a head position error log 37, and a learning filter generation unit 38. Further, the description of the elements common to the first embodiment will be omitted.

The VCM controller 32 outputs a signal indicating a first actuator operation amount of the VCM control target 33 based on the position error. Then, the CPU 11 causes the VCM control target 33 to receive a signal indicating a corrected operation amount obtained by adding the signal indicating the first actuator operation amount and the test signal. Here, the test signal is a signal such as a sweep signal, a write signal, an M sequence, or the like.

The MA controller 34 outputs a signal indicating a second actuator operation amount of the MA control target 35 based on the position error. Then, the CPU 11 causes the MA control target 35 to receive a signal indicating the second actuator operation amount. The CPU 11 calculates a difference value (position error) between the current position of the entire two-stage actuator, which is actuated by the VCM control target 33 and the MA control target 35, and the target position. Then, the CPU 11 stores the position error in the head position error log 39. The learning filter generation unit 38 calculates the transfer function of the learning filter 36 by identifying the parameters thereof by a known technique based on the test signal and the head position error log 39. The learning filter generation unit 38 inputs the calculated transfer function to the learning filter 36. The learning filter generation unit 38 is implemented by, for example, the CPU 11 or the like.

Figure 6A:
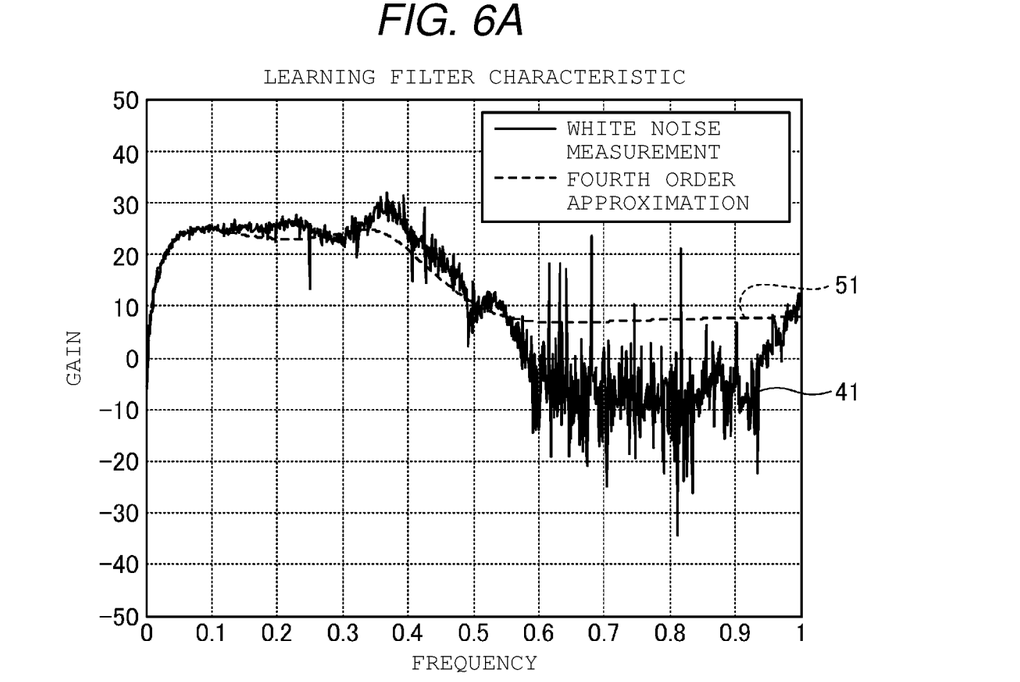
FIG. 6A is a diagram illustrating a gain transfer characteristic of an FIR filter.
Figure 6B:
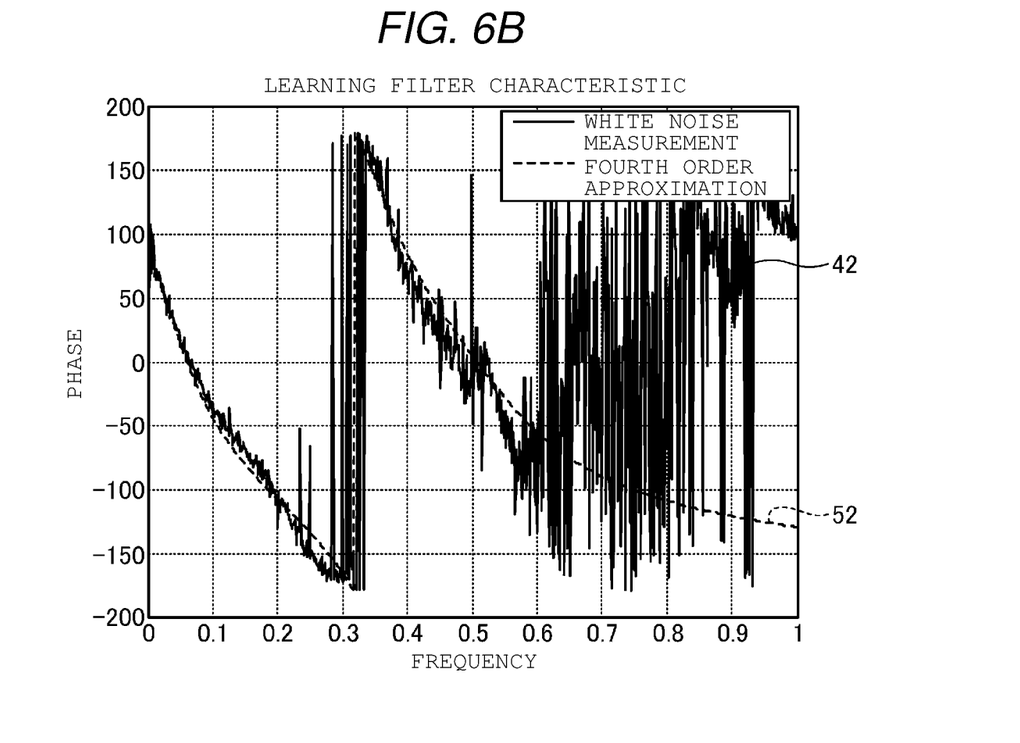
FIG. 6B is a diagram illustrating a phase transfer characteristic of the FIR filter.

FIG. 6A illustrates a gain transfer characteristic of the learning filter 36 calculated by the head positioning control system according to the second embodiment. FIG. 6B illustrates a phase transfer characteristic calculated by the head positioning control system according to the second embodiment. Reference numerals 41 and 51 indicate the gain and phase of the calculated vibration transfer characteristics of Pv/(1+Cv*Pv+Cm*Pm), respectively. Reference numerals 42 and 52 indicate the gain and phase of the characteristics of a learning filter in a system of the related art.

As illustrated in FIGS. 6A and 6B, reference numeral 51 approximates reference numeral 41, and reference numeral 52 approximates reference numeral 42.

The disk device according to the second embodiment controls the VCM control target 33 based on the test signal and the first actuator operation amount and determines the transfer function of the learning filter 36 based on the difference between the current position of the head and the target position.

In this way, the disk device can determine the transmission function of the learning filter used in the position adjustment of the head using the two-stage actuator by using the test signal.

While certain embodiments have been described, these embodiments have been presented by way of example only, and are not intended to limit the scope of the disclosure. Indeed, the novel embodiments described herein may be embodied in a variety of other forms; furthermore, various omissions, substitutions, and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A disk device comprising:
a disk;
an actuator assembly;
a head mounted on the actuator assembly;
a first actuator configured to move the actuator assembly;
a second actuator configured to move the head;
a vibration sensor;
a first controller configured to determine a first operation amount of the first actuator based on a difference between a current position of the head and a target position of the head, the first operation amount being corrected using a first filter value;
a second controller configured to determine a second operation amount of the second actuator based on the difference; and
a processor configured to:
perform a first filtering to calculate a first filter value based on a vibration detected by the vibration sensor at multiple points in time and filter coefficients,
perform a second filtering to generate a second filter value based on the vibration detected by the vibration sensor at each of the multiple points in time; and
update the filter coefficients based on the second filter values and a difference between the target position and an updated position of the head, which has been positioned thereto by operating the first actuator by the corrected first operation amount and operating the second actuator by the second operation amount.

2. The disk device according to claim 1, wherein the second controller determines the second operation amount of the second actuator without reliance on the first filter value.

3. The disk device according to claim 1, wherein a transfer function of the learning filter is expressed as Pv/(1+Cv*Pv+Cm*Pm), wherein Pv is a characteristic of the first actuator, Cv is a characteristic of the first controller, Pm is a characteristic of the second actuator, and Cm is a characteristic of the second controller.

4. The disk device according to claim 1, wherein the second filtering is an infinite impulse response filtering.

5. The disk device according to claim 4, wherein the second filtering employs a linear digital infinite impulse response filtering, to generate the second filter value based on a digital value indicating the vibration detected by the vibration sensor.

6. The disk device according to claim 1, wherein the processor updates the filter coefficients by adding predetermined values corresponding to the second filter values, respectively.

7. The disk device according to claim 1, wherein the processor generates the first filter value based on a sum of multiplication of the vibration detected by the vibration sensor at multiple points in time and the filter coefficients, respectively.

8. The disk device according to claim 1, wherein the first controller is configured to:
generate a modified first operation amount of the first actuator by modifying the first operation amount using a test signal;
log the difference between the target position and the updated position of the head each time the updated position of the head is determined; and
set parameters for generating the second filter value based on the test signal and the logged differences.

9. The disk device according to claim 1, wherein the vibration sensor is configured to perform a vibration detection at a regular interval.

10. The disk device according to claim 1, wherein the first controller is configured to perform a coarse positioning of the head with the first actuator, and the second controller is configured to perform a fine positioning of the head with the second actuator.

11. A method of controlling a disk device including a disk, an actuator assembly, a head mounted on the actuator assembly, a first actuator configured to move the actuator assembly, a second actuator configured to move the head, and a vibration sensor, the method comprising:
performing a first filtering to generate a first filter value based on a vibration detected by the vibration sensor at multiple points in time and filter coefficients;

determining a first operation amount of the first actuator based on a difference between a current position of the head and a target position of the head;

correcting the first operation amount using the first filter value;

determining a second operation amount of the second actuator based on the difference;

performing a second filtering to generate a second filter value based on the vibration detected by the vibration sensor at each of the multiple points in time;

determining a difference between the target position and an updated position of the head, which has been positioned by operating the first actuator by the corrected first operation amount and operating the second actuator by the second operation amount; and updating the filter coefficients based on the second filter values and the determined difference.

12. The method according to claim 11, wherein the second operation amount of the second actuator is determined without reliance on the first filter value.

13. The method according to claim 11, wherein a transfer function of the learning filter is expressed as Pv/(1+Cv*Pv+Cm*Pm), wherein Pv is a characteristic of the first actuator, Cv is a characteristic of the first controller, Pm is a characteristic of the second actuator, and Cm is a characteristic of the second controller.

14. The method according to claim 11, wherein the second filtering is an infinite impulse response filtering.

15. The method according to claim 14, wherein the second filtering employs a linear digital infinite impulse response filtering, to generate the second filter value based on a digital value indicating the vibration detected by the vibration sensor.

16. The method according to claim 11, wherein the filter coefficients are updated by adding predetermined values corresponding to the second filter values, respectively.

17. The method according to claim 11, wherein the first filter value is generated based on a sum of multiplication of the vibration detected by the vibration sensor at multiple points in time and the filter coefficients, respectively.

18. The method according to claim 11, further comprising:

generating a modified first operation amount of the first actuator by modifying the first operation amount using a test signal;

logging the difference between the target position and the updated position of the head each time the updated position of the head is determined; and calculating parameters for the second filtering based on the test signal and the logged differences; and setting the parameters of the learning filter to the calculated parameters.

19. The method according to claim 11, wherein the vibration sensor is configured to perform a vibration detection at a regular interval.

20. The method according to claim 11, wherein a coarse positioning of the head is performed with the first actuator, and a fine positioning of the head is performed with the second actuator.

* * * * *